United States Patent [19]

Mathias

[11] Patent Number: 4,661,598

[45] Date of Patent: Apr. 28, 1987

[54] NEW MONOMER AND POLYMERS CONTAINING 4-AMINOPYRIDINE

[75] Inventor: Lon J. Mathias, Hattiesburg, Miss.

[73] Assignee: The University of Southern Mississippi, Hattiesburg, Miss.

[21] Appl. No.: 858,130

[22] Filed: May 1, 1986

Related U.S. Application Data

[63] Continuation of Ser. No. 674,740, Nov. 26, 1984, Pat. No. 4,591,625.

[51] Int. Cl.$^4$ ............................................ C07D 213/74
[52] U.S. Cl. ...................................... 546/304; 526/265
[58] Field of Search ........................... 546/304; 526/265

[56] References Cited

U.S. PATENT DOCUMENTS 4,140,853  2/1979  Vor Brueggen .................... 546/304

Primary Examiner—Paul R. Michl
Attorney, Agent, or Firm—Wegner & Bretschneider

[57] ABSTRACT

There is disclosed 4-(diallylamino)pyridine and water-soluble polymers made therefrom. The polymers are useful as reagents or catalysts.

1 Claim, No Drawings

NEW MONOMER AND POLYMERS CONTAINING 4-AMINOPYRIDINE

This application is a continuation of Ser. No. 674,710, filed Nov. 26, 1984, now U.S. Pat. No. 4,591,625.

BACKGROUND OF THE INVENTION

The present invention relates to a new monomer and polymers containing 4-aminopyridine. More particularly, the invention relates to 4-(diallylamino)pyridine and water-soluble polymers derived from 4-(diallylamino)pyridine. Both homopolymers and copolymers derived from 4-(diallylamino)pyridine and having 4-aminopyridine units as part of the polymeric backbone are within the scope of the present invention.

DISCUSSION OF THE PRIOR ART

It is known that 4-dialkylaminopyridines are excellent catalysts for the acylation, tritylation, silylation, esterification, and lactonization of a variety of organic compounds. 4-Dialkyl-aminopyridines are also useful in the conversion of 1,2-diols and nitrimines into alkenes and alkynes, in the formation of heterocycles, and in the oxidation of organic functional groups. Moreover, 4-dialkylaminopyridines have a variety of uses in polymer chemistry, such as in the formation of various types of polyurethanes. A good reference discussing the utility of 4-dialkylaminopyridines is Scriven, E.F.V., 4-Dialkylaminopyridines: Super Acylation and Alkylation Catalysts, Chem. Soc. Rev. 12, 129 (1983).

Polymers having either polyethyleneimine or polystyrene backbones and pyridine side chains have been reported; see. E. J. Delaney et al., J. Amer. Chem Soc. 104, 799(1982) and M. Tomoi et al., Makromol. Chem., Rapid Comm., 3,537(1982), respectively. These polymers, however, have certain drawbacks when they are employed as catalysts. Delaney, et al. describe incorporation of 1 to 16 mole % of 4-aminopyridines into polyethyleneimine. The authors report that "in some cases, it proved difficult to achieve incorporation of more than a few percent of the aminopyridine into polymer"; see page 804. Tomoi, et al. discuss incorporation of 20 mole % of a 4-aminopyridine into cross-linked polystyrene polymers. Polymers with a polyethyleneimine backbone display a high degree of branching while polymers with a polystyrene backbone are highly hydrophobic. The polyethyleneimine backbone polymers contain primary, secondary, and tertiary amine functions which make it difficult to characterize reaction products and to separate catalytic effects of the backbone from those of the incorporated functionality. The hydrophobic backbone of the polystyrene-based polymers often controls and complicates the behavior of bound catalytic groups. The polymers of the present invention are improvements over these polymers of the prior art in that the high degree of branching associated with polyethyleneimine-backbone polymers is eliminated and there is a reduction of hydrophobicity associated with polystyrene-backbone polymers.

It is also known that diallylamine-type compounds can be cyclopolymerized. See Odian, Principles of Polymerization, 23rd ed., Wiley, N.Y. (1981), 488–497.

GENERAL DESCRIPTION OF THE INVENTION

The present invention is directed to a new monomer, 4-(diallylamino)pyridine and water-soluble polymers derived from 4-(diallylamino)pyridine containing 4-dialkylaminopyridine groups as part of the polymer backbone. The polymers, when used as catalysts (see the discussion infra), display improved characteristics over prior art polymers having pyridine side chains, as the homopolymers of the present invention do not have their performance limited or diluted by the backbone, while the structure of the copolymers can be manipulated to change the activity and solubility thereof. Moreover, cooperativity effects involving more than one catalytic group may facilitate some applications. Cooperative effects between neighboring sites have been shown, in general, to play an important role in catalysis by polymeric catalysts. For the polymers of the present invention, one 4-aminopyridine moiety is expected to act as a general base while another moiety acts as a nucleophile.

The new monomer, 4-(diallylamino)pyridine, has the following structural formula

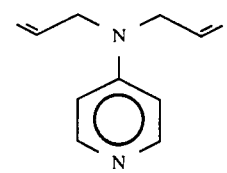

DETAILED DESCRIPTION OF THE INVENTION

The new monomer of the present invention can be formed by reacting 4-chloropyridine with diallylamine as shown in Example 1, infra. Generally, 4-chloropyridine is reacted with a molar excess of diallylamine under refluxing conditions. It is preferred to carry out the reaction under an inert atmosphere, e.g., a nitrogen atmosphere. The reaction is normally carried out at atmospheric pressure and at a temperature of from about 110° to about 130° C. for about 24 hours. Following the reaction, the reaction mixture is neutralized with an aqueous base, e.g., NaOH, LiOH, KOH, or $Na_2CO_3$, followed by extraction with organic solvents such as ether and distillation under reduced pressure. These are conventional techniques will known to the artisan.

Polymers prepared from 4-(diallylamino)pyridine are useful as reagents and catalysts. When used as reagents, the polymers function much like ion exchange resins. When a reagent containing a labile alkyl or acyl group is passed over a bed of the polymer, the polymer reacts and/or complexes the acyl or alkyl group. Subsequently, when a chemical substrate suitable for attack by an acyl or alkyl groups is passed over the complexed or reacted bed, the acyl or alkyl group is passed on to the substrate and the bed is ready for reuse. The intermediate complex is more reactive and/or selective than the reagent containing the labile acyl or alkyl group.

The polymers are also useful as catalysts for acylation and alkylation reactions. See Scriven, E.V., 4-Dialkylaminopyridines: Super Acylation and Alkylation Catalysts, Chem. Soc. Revs. 12, 129 (1983) and Hofle, G., et al., 4-Dialkylaminopyridines as Highly Active Acylation Catalysts, Agnew. Chem. Int. Ed. Engl. 17, 569 (1978).

It is possible to form water-soluble homopolymers of 4-(diallylamino)pyridine or water-soluble copolymers formed by reacting 4-(diallylamino)pyridine with at least one other ethylenically unsaturated comonomer. The comonomers that can be used in forming copolymers of the present invention include essentially all vinyl, acrylic, and diene monomers that are capable of copolymerizing under free radical conditions. Representative comonomer groups include, but are not limited to acrylic acid and various derivatives including salts, esters, and amides including substituted derivatives; styrene and styrene derivatives; butadiene and butadiene derivatives; vinyl pyridines and derivatives thereof; vinyl esters such as vinyl acetate; N-vinyl amides; vinyl sulfone and sulfates; and allyl amine and allyl alcohol derivatives. Specific comonomers include methyl methacrylate, methyl acrylate, ethyl acrylate, ethyl methacrylate, acrylamide, methacrylamide, dimethylacrylamide, acrylic acid, styrene, α-methyl styrene, p-methyl styrene, butadiene, vinyl pyridine, vinyl acetate, allyl amine, diallylamine, methyldiallylamine, dimethylallylamine, dimethyldiallylammonium chloride, and allyl alcohol. Polymerization is normally carried out by a free radical process. Typical free radical initiators such as azo initiators or peroxide initiators can be used in the polymerization process. The selection and use of free radical initiators is reviewed in an excellent manner in Sheppard, C. S., et al., Polymerization Engineering Science, 1979, 19, 597–606, incorporated by reference herein. Representative free radical initiators include t-butylhydroperoxide, potassium persulfate, redox initiator systems such as a mixture of titanium trichloride and hydrogen peroxide, and 2-2'-azo-bis-(2-amidinopropane)hydrochloride. A particularly preferred initiator is a water-soluble azo initiator, 2-2'-azobis-(2-amidinopropane)hydrochloride sold by Wako Chemicals USA, Inc. Dallas, Tx., under the name Vazo-50. For purposes of the present invention, azo initiators have been found to be better than peroxide and redox initiators. Azo initiators yield cleaner (less colored) polymers than do peroxide initiators, and this is particularly so in the case of cyclopolymerizations with diallylamines. Moreover, for polymerizations involving diallylamine, azo initiators gave higher molecular weight products than those prepared using peroxide initiators. Redox initiators involve two components and, in addition to being cumbersome to use, yield highly colored polymers with diallylaminopyridine and other diallylamines.

For the polymerization reactions, a nonreactive solvent should be used. Typical solvents include, but are not limited to, water, lower alcohols (e.g., methanol, ethanol, and isopropanol), dipolar aprotic solvents, and hydrocarbon solvents.

For polymerization reactions, the monomer must be in salt form; see Examples 2 to 5 infra. The pryidine nitrogen may be protonated or otherwise substituted with protonic acids, Lewis acids, alkyl groups, acyl groups, or sulfonic and phosphonic acid derivatives. Representative examples include the hydrochloric acid salt and the methylsulfonyl chloride salt.

The polymerization is carried out at a temperature ranging from about 30° to about 80° C.; a preferred temperature range is from about 50° to about 70° C.

Polymerization is normally carried out for a period of from about 10 to about 30 hours.

The homopolymer of 4-(diallylamino)pyridine contains repeating units of the formula

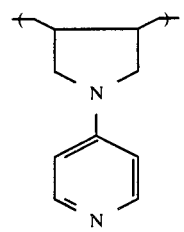

The homopolymer is soluble in water only at a low pH. The homopolymer hydrochloride salt is a water-soluble material. The homopolymer has a molecular weight of less than 25,000. A representative molecular weight range for the homopolymer of the invention is from about 5,000 to about 10,000.

The copolymers of the present invention are random in configuration and water-soluble and have higher molecular weights than the homopolymers. The copolymers have molecular weights greater than 15,000 and a representative molecular weight range is from about 25,000 to about 1,000,00.

A preferred copolymer is made by reacting 4-(diallylamino)pyridine with diallylamine (see Example 3 infra) to give a polymer with units of

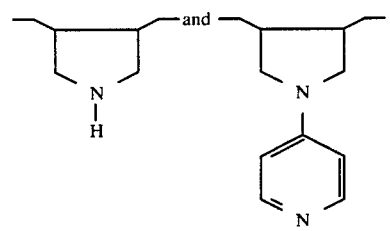

The polymer is a random copolymer.

Although the polymers of the present invention are water-soluble, some of the polymers are organic solvent-soluble also. For example, it has been found that the neutral homopolymer is soluble in lower alcohols, chlorinated solvents the lower ketones as are many of the neutral copolymers of the invention. An important property of the polymers is their solubility in water. Water solubility facilitates reactions in aqueous media and dispersed or nondispersed immiscible aqueous-organic solvent systems.

The following examples are representative of the invention.

EXAMPLE 1

Preparation of 4-(Diallylamino)pyridine

4-Chloropyridine (13.24 g) was refluxed with excess diallylamine (28.40 g) under a nitrogen atmosphere for 3 days. The product mixture was neutralized with aqueous NaOH and extracted with ether. After drying, the ether was removed by simple distillation and the product purified by fractional distillation under reduced pressure. The pure 4-(diallylamino)pyridine (DAAP) was characterized by elemental analysis, FTIR, $^{13}$C NMR, and GC.

EXAMPLE 2

Homopolymerization

DAAP (10 g) was dissolved in excess conc. HCl (6.325 g of 36.5% HCl/g) at 0° C. under a nitrogen blanket to form a 50% by weight solution of DAAP hydrochloride in water. Water-soluble azo initiator (0.3 g of Vazo-50) was added, and the polymerization carried out at 60° C. under a nitrogen blanket for 36 hours. The polymer solution was dialyzed against 5% aqueous NaCl and water to remove unreacted monomer and oligomers. The final solution was made basic with aqueous sodium hydroxide and the precipitated polymer dried under vacuum.

The structure of the polymer was confirmed by $^{13}C$ NMR and UV spectrum of an aqueous HCl solution of the polymer.

EXAMPLE 3

Copolymerization

Diallylamine and DAAP in a 4:1 to 9:1 ratio were dissolved in excess conc. HCl and the solution cooled to 0° C. under a nitrogen blanket. Water-soluble azo initiator (Vazo-50) was added, and the reaction maintained at 60° for several days until a highly viscous solution was obtained. The product solution was dialyzed against $H_2O$ to remove unreacted monomers and low molecular weight polymer. The final solution was then made basic with aqueous sodium hydroxide and the precipitated polymer dried under vacuum. Dialysis of the copolymer and lack of vinyl peaks in the NMR spectra rule out physically trapped monomeric compounds. The additional peaks in the regions corresponding to backbone and pyrrolidine carbons are attributed to the DAAP units.

The relative intensity of the NMR peaks is consistent with copolymer compositions (for both the 4:1 and 9:1 products) that are comparable to those of the feed compositions. Integration of the 4:1 polymer spectrum shown gives an intensity ratio of ca. 5:1 for each alkane group to each aromatic peak, equal to the expected value.

Further evidence for incorporation of DAAP units into the copolymer was confirmed by reading a UV spectrum. Actual concentrations are consistent with the NMR results regarding the degree of incorporation of DAAP. The UV spectrum of polydiallylamine shows no peaks in this region.

EXAMPLE 4

Dimethyldiallylammonium chloride and DAAP in a 4:1 ratio were dissolved in excess conc. HCl. The solution was polymerized using the same initiator and polymerization conditions as in Example 3. The post polymerization clean-up and analysis techniques were the same as in Example 3.

EXAMPLE 5

Dimethylacrylamide and DAAP in a 4:1 ratio were dissolved in excess conc. HCl. The solution was polymerized using the same initiator and polymerization conditions as in Example 3. The post polymerization clean-up and analysis techniques were the same as in Example 3. This monomer combination gives very high molecular weight polymers at a very fast rate. Typical molecular weights are 50,000 to 100,000 and the polymerization is complete within 10 to 12 hours.

What is claimed is:

1. 4-(Diallylamino)pyridine.

* * * * *